United States Patent [19]

Barrett

[11] Patent Number: 5,069,073
[45] Date of Patent: Dec. 3, 1991

[54] APPARATUS FOR DIFFUSING HIGH PRESSURE FLUID FLOW

[75] Inventor: Phillip L. Barrett, Stilwell, Kans.

[73] Assignee: T.D.F. Partnership, Kansas City, Kans.

[21] Appl. No.: 489,698

[22] Filed: Mar. 7, 1990

[51] Int. Cl.⁵ .......................... G01F 1/46; G01L 7/00
[52] U.S. Cl. ................................... 73/756; 73/861.65
[58] Field of Search ................. 98/76; 73/756, 861.65, 73/861.66, 861.67, 189

[56] References Cited

U.S. PATENT DOCUMENTS

| | | | |
|---|---|---|---|
| 261,398 | 7/1882 | Smith | 98/76 |
| 1,093,229 | 4/1914 | Wilkinson | 73/861.65 |
| 1,380,882 | 6/1921 | Brassington | 98/76 |
| 1,746,575 | 2/1930 | Barner | 239/550 |
| 2,182,280 | 12/1939 | Chipley et al. | 73/861.65 |
| 3,045,931 | 7/1962 | Hall | 239/538 |
| 4,187,913 | 2/1980 | Wilcox | 239/282 |
| 4,236,733 | 12/1980 | Zambrano | 285/23 |
| 4,470,177 | 9/1984 | Ganung et al. | 285/61 |

Primary Examiner—Donald O. Woodiel
Attorney, Agent, or Firm—Wm. Bruce Day

[57] ABSTRACT

An apparatus for reducing or diffusing the pressure within a high pressure stream of water or other fluid and simultaneously measuring the pressure in the flowing stream includes an inlet pipe fixed to a perpendicular discharge pipe to form a T-joint having two discharge ends covered with metal screen. A flow splitter is mounted transversely along a diameter of the inlet pipe for splitting the turbulent incoming fluid flow into two laminar flow sheets. A Pitot tube or probe is seated in the center of the flow splitter and is connected to an external pressure gauge by a Pitot tube static line comprising a bore through the flow splitter. The flow splitter includes a wedge splitter portion having substantially a triangular cross section and presenting the apex or narrow edge of the wedge to the incoming fluid flow.

12 Claims, 2 Drawing Sheets

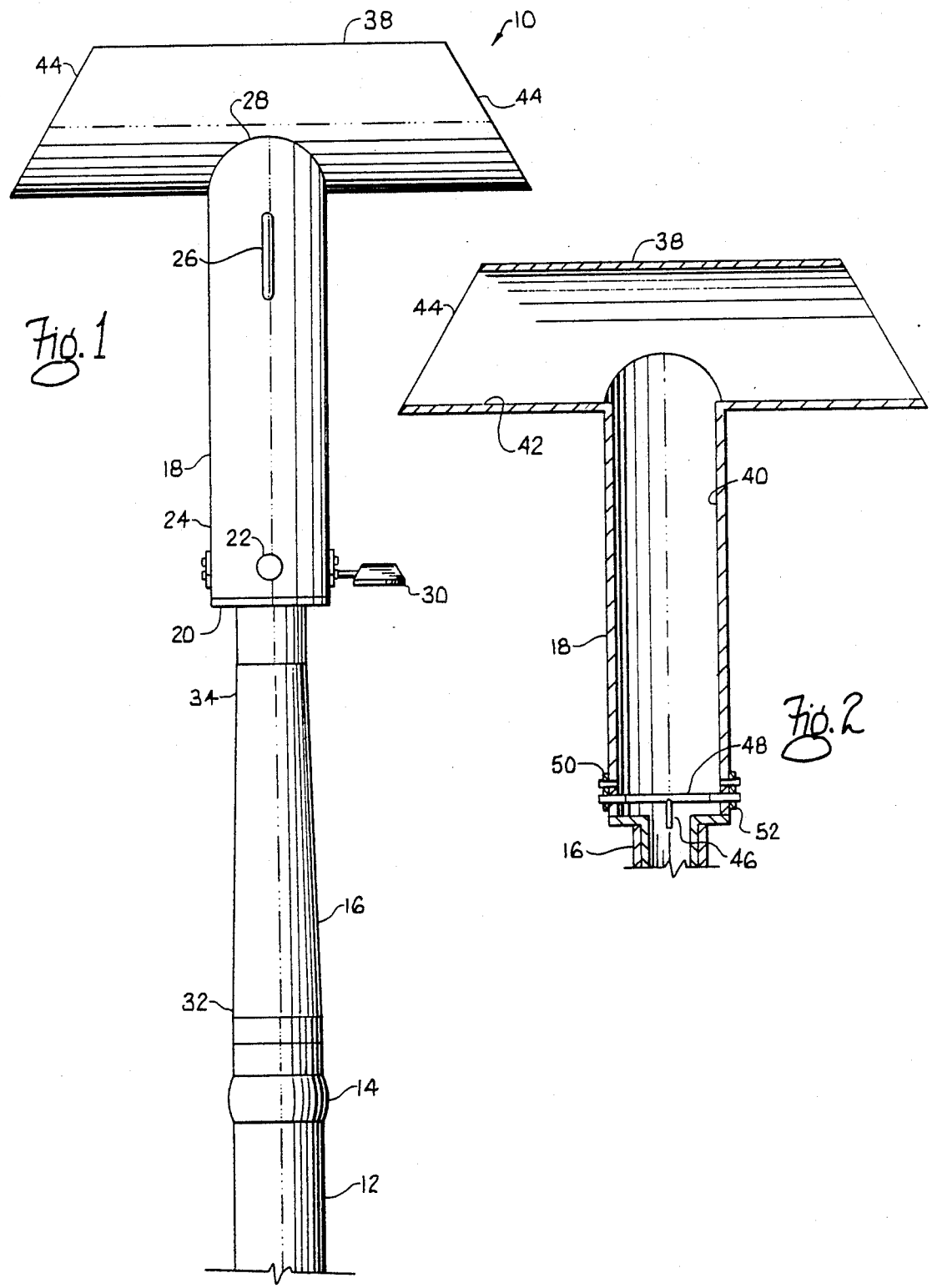

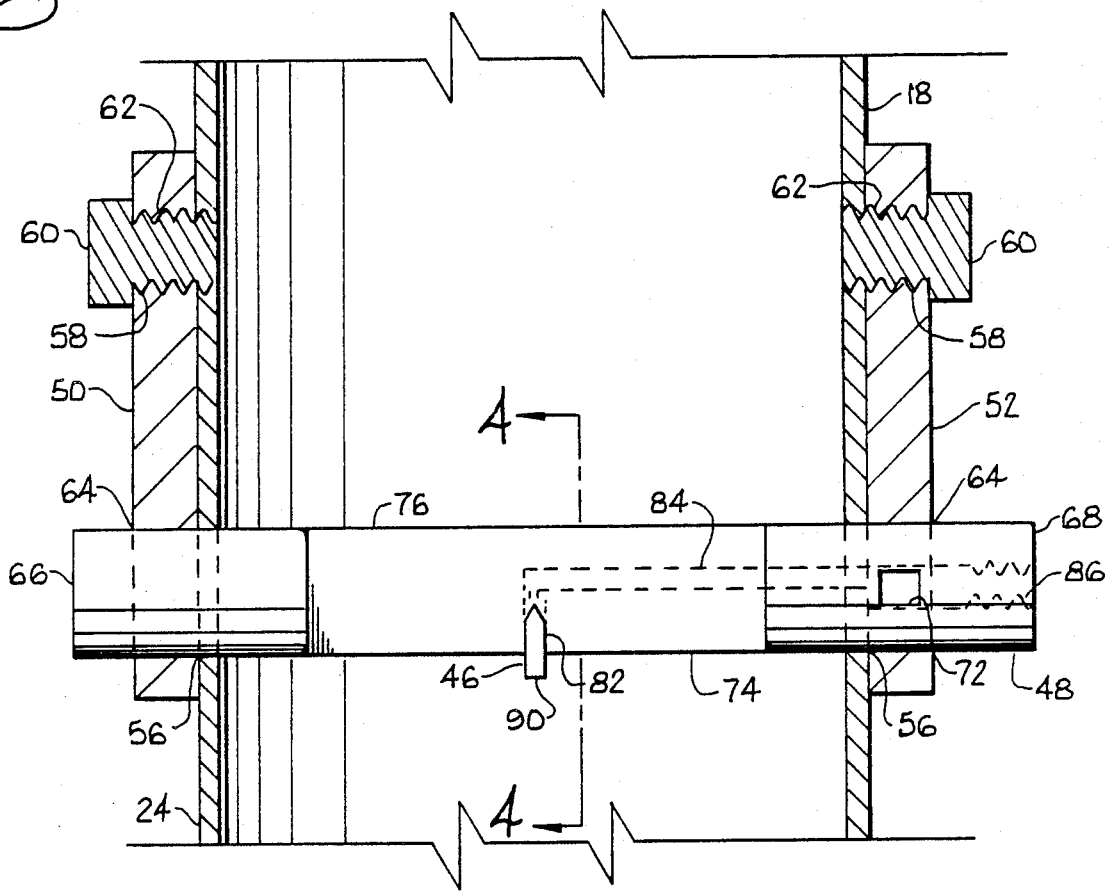
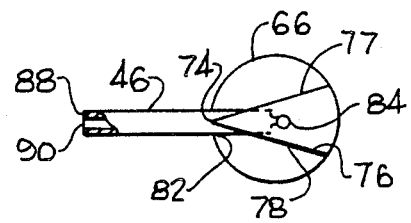
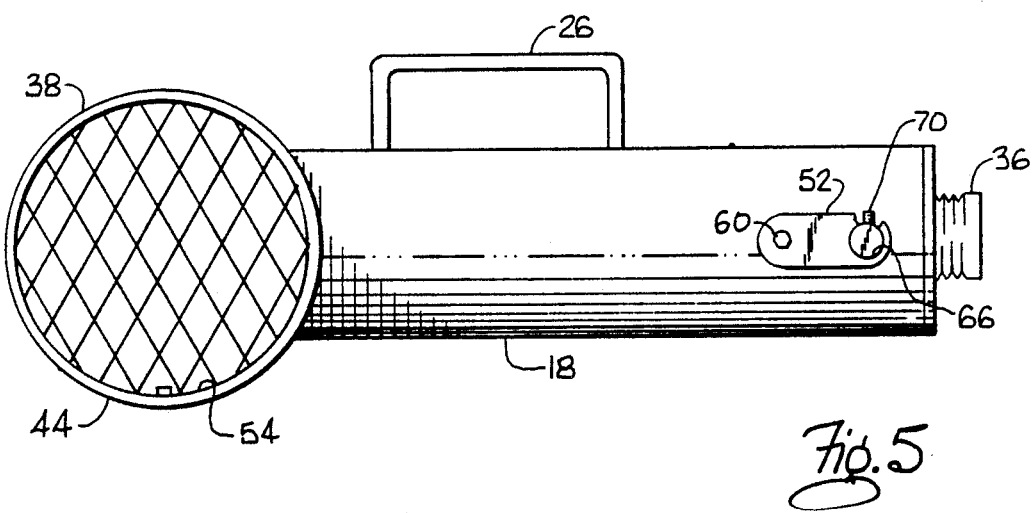

APPARATUS FOR DIFFUSING HIGH PRESSURE FLUID FLOW

BACKGROUND OF THE INVENTION

1. Field of The Invention

This invention relates to apparatus for reducing the effects of high pressure water during testing of high pressure water systems.

2. Description of the Prior Art

Building sprinkler systems designed for extinguishing fires within a building and fire stand pipes often carry extremely high water pressures. It is necessary to test the water pressure in these systems periodically to meet fire and safety codes.

In the prior art, the sprinkler system or stand pipe is typically connected to a hose and a playpipe and the valve opened to allow the free flow of high pressure water through the system and out the playpipe. A separate hand-held test instrument, typically a pressure gauge, is inserted into an aperture at the end of the playpipe near the water outlet. Water may be allowed to discharge from these systems for anywhere from a few minutes to half-an-hour or more during pressure tests. The water discharged from the playpipe typically cannot be directed with any great specificity or accuracy to a particular area, but instead flows primarily outdoors in the immediate vicinity of the building which contains the system under test. High pressure water spraying from the hose releases very strong forces that are difficult to control and tend to cause the hose and playpipe to swing from side to side and whip violently unless restrained. The high pressure water from the playpipe may dig holes in streets, driveways, parking lots and lawns, with results very similar to hydraulic mining. In addition to these difficulties, the high pressure flows from such tests can be dangerous to the tester and other people who may be in the area.

Accordingly, there is a need for a high pressure water testing apparatus that is easy to control; that dissipates the pressure from the system under test; and that is easy to use.

SUMMARY OF THE INVENTION

Accordingly, it is the primary object of the present invention to provide an apparatus for testing high pressure water systems that is easy to control.

It is another object of the present invention to provide a high pressure water testing apparatus that dissipates the pressure from the system under test.

It is a further object of the present invention to provide a high pressure water testing apparatus that is easy to use.

These and other objects of the present invention are achieved by providing an apparatus for measuring and then dissipating the pressure from a stream of high pressure fluid comprising a discharge pipe having two ends and an inlet pipe fixed to the discharge pipe such that the inlet pipe is perpendicular to the discharge pipe and the interior passageways in both pipes are in fluid communication with one another. The inlet pipe is fixed to the discharge pipe at about the midpoint between the two ends of the discharge pipe, forming a T-joint.

In one embodiment of the present invention, a flow splitter splits the stream of incoming fluid into two random laminar flows, reducing any directional thrust the fluid may otherwise exhibit upon discharge. In another embodiment, a Pitot tube located inside the inlet pipe is connected to a Pitot tube static line in fluid communication with the exterior of the inlet pipe for accurately measuring the pressure of the fluid within the inlet pipe. In the preferred embodiment, the Pitot tube is embedded in the flow splitter, which is transversely mounted along a diameter of the inlet pipe and includes a bore comprising a Pitot tube static line which allows for attaching an external pressure gauge. The central location of the Pitot tube within the inlet pipe combined with the reduction in turbulence around the Pitot tube resulting from the action of the flow splitter generates more accurate and reliable pressure test results.

The inlet pipe includes an inlet end for coupling with a playpipe for delivering a high pressure fluid, such as water, to the apparatus. The inlet end of the inlet pipe may be threaded.

The inlet pipe further comprises a handle fixed on the top portion of the inlet pipe and a small aperture or slot through a side wall of the inlet pipe for manually inserting a test instrument, such as a hand-held Pitot tube and pressure gauge.

The apparatus further comprises a means for measuring the pressure of fluid flowing through the inlet pipe, which comprises a Pitot tube that is embedded in a transversely mounted flow splitter within the inlet pipe. The flow splitter translates the swirling motions of a fluid flowing through the inlet pipe into two random laminar flow sheets. The flow is split by a flow splitter comprising a cylindrical rod having wedge shaped segment or portion positioned with the narrow edge of the wedge facing the incoming flow of the fluid in the inlet pipe. The Pitot tube also includes a Pitot tube static line comprising two communicating bores through the flow splitter that communicate with the outside of the inlet pipe and includes a threaded portion that allows attachment of an external pressure sensor or gauge.

The two ends of the discharge tube are cut off at an angle such that the water flowing from them tends to flow away from the inlet pipe where the user would probably stand in order to read the pressure meter. The discharge ends are covered with expanded metal, which causes random turbulence in the discharged fluid, further reducing the effective force of the water pressure.

Other objects and advantages of the present invention will become apparent from the following description taken in connection with the accompanying drawings, wherein is set forth by way of illustration and example, an embodiment of this invention and the best mode currently known to the inventor for carrying out the invention.

BRIEF DESCRIPTION OF THE DRAWINGS

FIG. 1 is a top plan view of an apparatus for diffusing or dissipating the pressure of a stream of high pressure fluid according to the present invention.

FIG. 2 is a longitudinal cross section of the apparatus of FIG. 1.

FIG. 3 is an enlarged cross section of the apparatus illustrating the positioning of the Pitot tube and the flow splitter.

FIG. 4 is an enlarged sectional view taken along lines 4—4 of FIG. 3.

FIG. 5 is a side elevation of the apparatus.

DESCRIPTION OF THE PREFERRED EMBODIMENT

As required by the statutes, a detailed embodiment of the present invention is disclosed herein. It is however, to be understood that the disclosed embodiment is merely illustrative of the invention, which may be embodied in various forms. Therefore, specific structural and functional details disclosed herein are not to be interpreted as limiting, but merely to provide the proper basis for the claims and as a representative basis for teaching one skilled in the art to employ the invention in virtually any appropriately specific and detailed structure.

Referring to FIG. 1, there is shown the apparatus 10 connected to a playpipe 16 by the threaded coupling 36 (see FIGS. 1 and 5). The playpipe 16 is in turn connected to a hose 12 by a threaded coupling 14. The hose 12 is connected to the high pressure fluid system to be tested (not shown).

A vent aperture 22 is disposed within the side wall 24 of the inlet pipe 18 near the inlet end 20. The vent aperture 22 reduces the possibility that air may become trapped within the apparatus 10 when water is being forced through it and thereby provide a false reading of pressure on pressure gauges attached to the apparatus 10. The vent aperture 22 also provides a place to insert a hand-held Pitot tube and pressure gauge. A handle 26 is welded on the top of the inlet pipe 18 at a convenient location between the inlet end 20 and the outlet end 28. A pressure gauge 30 is disposed outside of the inlet pipe 18 and measures the pressure within the inlet pipe 18 based on data from a Pitot tube 46 mounted inside the inlet pipe 18, as will be described in detail below.

The playpipe 16 is a standard unit pipe having a standard length and a standard constriction or taper from the lower end 32 to the upper end 34. This constriction, or nozzle effect, changes the pressure of the fluid flowing through it. The playpipe 16 is virtually universally employed when testing the pressure of water within fire sprinkler systems or stand pipe systems.

Still referring to FIG. 1, the discharge pipe 38 is fastened to the inlet pipe 18 by welding. The interior passageway 40 of the inlet pipe 18 is in full fluid communication with the interior passageway 42 of the discharge pipe 38. The discharge pipe 38 is perpendicular to the inlet pipe 18, forming a T-joint. The discharge ends 44 define the ends of discharge pipe 38 through which the water or other fluid is discharged. The discharge ends 44 may be perpendicular to the longitudinal axis of the discharge pipe 38, but in the preferred embodiment they are cut at such an angle such that a top plan view of the discharge pipe 38 has a trapezoidal shape with both non-parallel sides slanting inward from the base to the top of the trapezoid, as shown in FIG. 1. This design produces a slight nozzle effect that tends to reduce the amount of discharge that may be directed toward the inlet pipe 18 area, where a user will be standing.

Referring to FIG. 2, the Pitot tube 46 is mounted in the flow splitter 48, which is fixed by the brackets 50 across a diameter of the inlet pipe 18. The Pitot tube 46 is positioned or registered within the passageway 40 of the inlet pipe 18, in the very center of the passageway 40, or other location that provides the optimal position for sensing fluid flow, which allows the fluid pressure to be measured more accurately and with greater reliability.

Referring to FIG. 5, there is shown a side elevation of the apparatus 10 illustrating the expanded metal 54 that covers each discharge opening 44. The expanded metal screen 54, or other screen, increases the turbulence in the discharged water, thereby disrupting any tendency for strong directional flow that may remain after the water has been forced through the T-joint of the apparatus 10. The expanded metal screens 54 is welded into the opening of the discharge ends 44.

Referring to FIG. 3, the flow splitter 48 is mounted transversely within the inlet pipe 18 across a diameter of the inlet pipe 18 by inserting the flow splitter 48 through the apertures 56 in the side wall 24 of the inlet pipe 18. Two brackets 50, 52, hold the flow splitter 48 in position. Each bracket 50, 52 includes a small aperture 58 through which a bolt 60 is inserted and is received by the threads 62 in the side wall 24. Each of the brackets 50, 52 further includes a large aperture 64, which is penetrated by the cylindrical ends 66, 68 of the flow splitter 48. The bracket 52 further includes a setscrew 70 that is received in a threaded bore, (see FIG. 5). The setscrew 70 is received by the setscrew well 72 adjacent to the cylindrical end 68 of the flow splitter 48 (on the right hand side in FIG. 3). When the parts are all aligned as required to fit together as described, with the setscrew 70 seated in the setscrew well 72, the flow splitter 48 and the Pitot tube 46 are properly positioned or registered within the inlet pipe 18.

Referring to FIG. 4, the flow splitter 48 includes a wedge or wedge-shaped splitter portion 76. The straight, flat edges 77, 78 of the wedge splitter portion 76 come together to form an edge 74, which is presented to the incoming flow of fluid through the inlet pipe 18. Water, or other fluid flowing under high pressure within a cylindrical pipe tends to have turbulent flow, which makes it difficult to measure the pressure accurately with the Pitot tube and causes additional and unnecessary turbulence in the discharge of the water. The wedge splitter portion 76 splits this turbulent flow into two smooth laminar flow sheets, and reduces the turbulence in the flow immediately upstream of the edge 74, thus providing a more accurate pressure reading from the Pitot tube 46.

Referring again to FIG. 3, the flow splitter 48 includes a Pitot tube 46 seated in the bore or Pitot tube bore 82. A Pitot tube static line or longitudinal bore 84 for transmitting information generated by the Pitot tube 46 to a remote pressure gauge 30 is bored through the flow splitter 48 from the end 68 until it intersects the perpendicular bore 82. The longitudinal bore 84 preferably lies along the center line or longitudinal axis of flow splitter 48. The Pitot tube static line 84 includes an enlarged threaded bore 86 adjacent to the end 68 for receiving the male threads from a pressure gauge 30. The Pitot tube 46 includes an interior tubular passageway 88.

A stagnation point forms at the opening 90 of the Pitot tube or probe 46, where the speed of the water is zero. By applying Bernoulli's equation to the stagnation point, and to a point at a large distance from the probe or Pitot tube 46, that is, outside of the inlet pipe 18, the pressure, consisting of the sum of the static pressure and the dynamic pressure, of the water or other fluid flowing through the inlet pipe 18 can be calculated. Conventionally, the calculations are made beforehand and the desired result can be read directly from a dial indicator meter or gauge 30.

When the flow splitter 48 is properly aligned, as indicated by the seating of the set screw 70 in the set screw well 72 and the seating of the brackets 50, 52 about the ends 66, 68, which engage the flow splitter 48, respectively of the flow splitter 48, and the bolts 60 are tightened, then the probe or Pitot tube 46 is positioned in the exact middle of the flow through the inlet pipe 18, or in such other position as may be optimal for generating accurate pressure readings for the fluid flowing through the inlet pipe 18, as may be determined by characteristics of different styles of inlet tubes.

While certain forms of this invention have been illustrated and described herein, the invention is not limited thereto, except insofar as such limitations are included in the following claims.

What is claimed and desired to be protected by Letters Patent is as follows:

1. An apparatus for dissipating the pressure of a stream of high pressure fluid comprising:
    (a) a discharge pipe having two ends;
    (b) an inlet pipe fixed to said discharge pipe such that said inlet pipe is perpendicular to said discharge pipe and an interior passageway in both said pipes are in fluid communication with one another; and
    (c) a flow splitter mounted within said inlet pipe along a diameter of said inlet pipe and means for retaining said flow splitter in position, said flow splitter retaining means further comprising two apertures through a side wall of said inlet pipe through which said flow splitter is inserted, and one bracket fixed to the exterior of said side wall adjacent to each said aperture, said brackets engaging said flow splitter.

2. An apparatus as claimed in claim 1 wherein flow splitter further comprises a wedge-shaped portion having an edge for splitting an incoming fluid stream into two streams.

3. An apparatus as claimed in claim 1 further comprising means for automatically registering said flow splitter in proper position within said inlet pipe.

4. An apparatus for dissipating the pressure of a stream of high pressure fluid comprising:
    (a) a discharge pipe having two ends;
    (b) an inlet pipe fixed to said discharge pipe such that said inlet pipe is perpendicular to said discharge pipe and an interior passageway in both said pipes are in fluid communication with one another; and
    (c) means for splitting the stream of fluid flowing through said inlet pipe into two fluid streams, said splitting means further comprising a flow splitter mounted within said inlet pipe along a diameter of said inlet pipe, said flow splitter further comprising a wedge-shaped portion having an edge for splitting an incoming fluid stream into two streams.

5. An apparatus for measuring the pressure of a stream of high pressure fluid comprising:
    (a) a discharge pipe having two ends;
    (b) an inlet pipe fixed to said discharge pipe such that said inlet pipe is perpendicular to said discharge pipe and an interior passageway in both said pipes are in fluid communication with one another;
    (c) means for measuring the pressure of a fluid flowing through said inlet pipe, said means being positioned within said inlet pipe,
    (d) said pressure measuring means further comprising a pitot tube;
    (e) means for mounting said pitot tube within said inlet pipe and a pitot tube static line connected to said pitot tube and in fluid communication with the exterior of said inlet pipe; and
    (f) a cylindrical rod transversely mounted within said inlet pipe, a longitudinal bore within said cylindrical rod in fluid communication with the exterior of said inlet pipe, a pitot tube bore perpendicular to and intersecting said longitudinal bore wherein said pitot tube is mounted.

6. An apparatus for measuring the pressure of a stream of high pressure fluid comprising:
    (a) a discharge pipe having two ends;
    (b) an inlet pipe fixed to said discharge pipe such that said inlet pipe is perpendicular to said discharge pipe and an interior passageway in both said pipes are in fluid communication with one another;
    (c) means for measuring the pressure of a fluid flowing through said inlet pipe, said means being positioned within said inlet pipe; and
    (d) each said end of said discharge pipe further comprising means for increasing the turbulence of the discharged fluid.

7. An apparatus for measuring the pressure of a stream of high pressure fluid comprising:
    (a) a discharge pipe having two ends;
    (b) an inlet pipe fixed to said discharge pipe such that said inlet pipe is perpendicular to said discharge pipe and an interior passageway in both said pipes are in fluid communication with one another; and
    means for measuring the pressure of a fluid flowing through said inlet pipe, said means being positioned within said inlet pipe, said ends of said discharge pipe being cut at an angle to the longitudinal axis of said discharge pipe for reducing the amount of discharge that may be directed toward said inlet pipe.

8. An apparatus as claimed in claim 7 wherein said turbulence increasing means further comprises expanded metal fixed across each said end of said discharge pipe.

9. A playpipe for measuring pressure in a stream of high pressure liquid comprising:
    (a) an inlet pipe section;
    (b) a pressure measurement device located within said inlet pipe section; and
    (c) a discharge pipe section having opposite ends and a middle portion, said discharge pipe section connected to said inlet pipe section generally at said middle portion and oriented perpendicularly, said opposite ends being angled away from said inlet pipe section for directing fluid outflow away from said inlet pipe section.

10. A playpipe for measuring pressure in a stream of high pressure liquid comprising:
    (a) an inlet pipe section;
    (b) a pressure measurement device within an aperture in said inlet pipe section; and
    (c) a discharge pipe section having opposite ends and a middle portion, said discharge pipe section connected to said inlet pipe section generally at said middle portion and oriented perpendicularly, said opposite ends including angled means for directing fluid outflow away from said inlet pipe section.

11. A playpipe for measuring pressure in a stream of high pressure liquid comprising:
    (a) an inlet pipe section having a through passage and an upper surface;

(b) a vent hole extending into said inlet pipe section for inserting a first pressure measurement device into said inlet pipe section;
(c) a second pressure measurement device comprising a pitot tube pressure sensor mounted in said inlet pipe section and having a dial face pressure gauge therewith for reading liquid pressure; and
(d) a discharge pipe section having opposite ends and a middle portion, said discharge pipe section connected to said inlet pipe section generally at said middle portion and oriented perpendicularly for high pressure liquid flow through said inlet pipe section and equally outwardly through said discharge pipe section opposite ends, said opposite ends having angle means directing said fluid outwardly and away from said inlet pipe section and equally outwardly through said discharge pipe section opposite ends, said opposite ends having angle means directing said fluid outwardly and away from said inlet pipe section.

12. A playpipe for measuring and then dissipating the pressure of a stream of high pressure liquid comprising:
(a) an inlet pipe section having a through passage;
(b) a pitot tube pressure sensor mounted in said inlet pipe section through passage and extending transversely thereto, said sensor being a substantially thin, tapering wedge shape and splitting the liquid stream to reduce turbulence and induce laminar flow; and
(c) a discharge pipe section having opposite ends and a middle portion, said discharge pipe section connected to said inlet pipe section generally at said middle portion and oriented perpendicularly for high pressure liquid flow through said inlet pipe section and equally outwardly through said discharge pipe section opposite ends.

* * * * *